(12) United States Patent
Haga et al.

(10) Patent No.: US 8,896,953 B2
(45) Date of Patent: Nov. 25, 2014

(54) DISK STORAGE APPARATUS AND METHOD FOR SHINGLED MAGNETIC RECORDING

(71) Applicant: Kabushiki Kaisha Toshiba, Tokyo (JP)

(72) Inventors: Tatsuya Haga, Fujisawa (JP); Hideaki Tanaka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/905,283

(22) Filed: May 30, 2013

(65) Prior Publication Data
US 2014/0177085 A1  Jun. 26, 2014

(30) Foreign Application Priority Data
Dec. 26, 2012  (JP) .................. 2012-283294

(51) Int. Cl.
*G11B 20/12* (2006.01)
*G06F 12/08* (2006.01)
*G11B 20/10* (2006.01)

(52) U.S. Cl.
CPC ...... *G06F 12/08* (2013.01); *G11B 2020/10675* (2013.01); *G11B 20/10527* (2013.01)
USPC .......................................................... 360/48

(58) Field of Classification Search
None
See application file for complete search history.

(56) References Cited

U.S. PATENT DOCUMENTS

| 7,965,465 | B2 * | 6/2011 | Sanvido et al. | 360/60 |
| 8,578,122 | B2 * | 11/2013 | Coker et al. | 711/170 |
| 8,599,507 | B2 * | 12/2013 | Sanvido et al. | 360/31 |
| 2011/0292538 | A1 | 12/2011 | Haga et al. | |

FOREIGN PATENT DOCUMENTS

| JP | 04-220739 A | 8/1992 |
| JP | 2011-134385 A | 7/2011 |

* cited by examiner

*Primary Examiner* — K. Wong
(74) *Attorney, Agent, or Firm* — Posz Law Group, PLC

(57) ABSTRACT

According to one embodiment, a disk storage apparatus includes a storage device, a writing controller, and a controller. The storage device includes a nonvolatile cache area in which a part of consecutive data is temporarily stored. The writing controller is configured to write the consecutive data in a recording area on a disk by an SMR method, the recording area being different from the cache area. The controller is configured to write the part of the data to the cache area, to invalidate data corresponding to logical addresses of the part of the data and recorded in the recording area on the disk, and to set a recording area with the invalidated data recorded therein to be an update recording area in which new data is recordable.

12 Claims, 5 Drawing Sheets

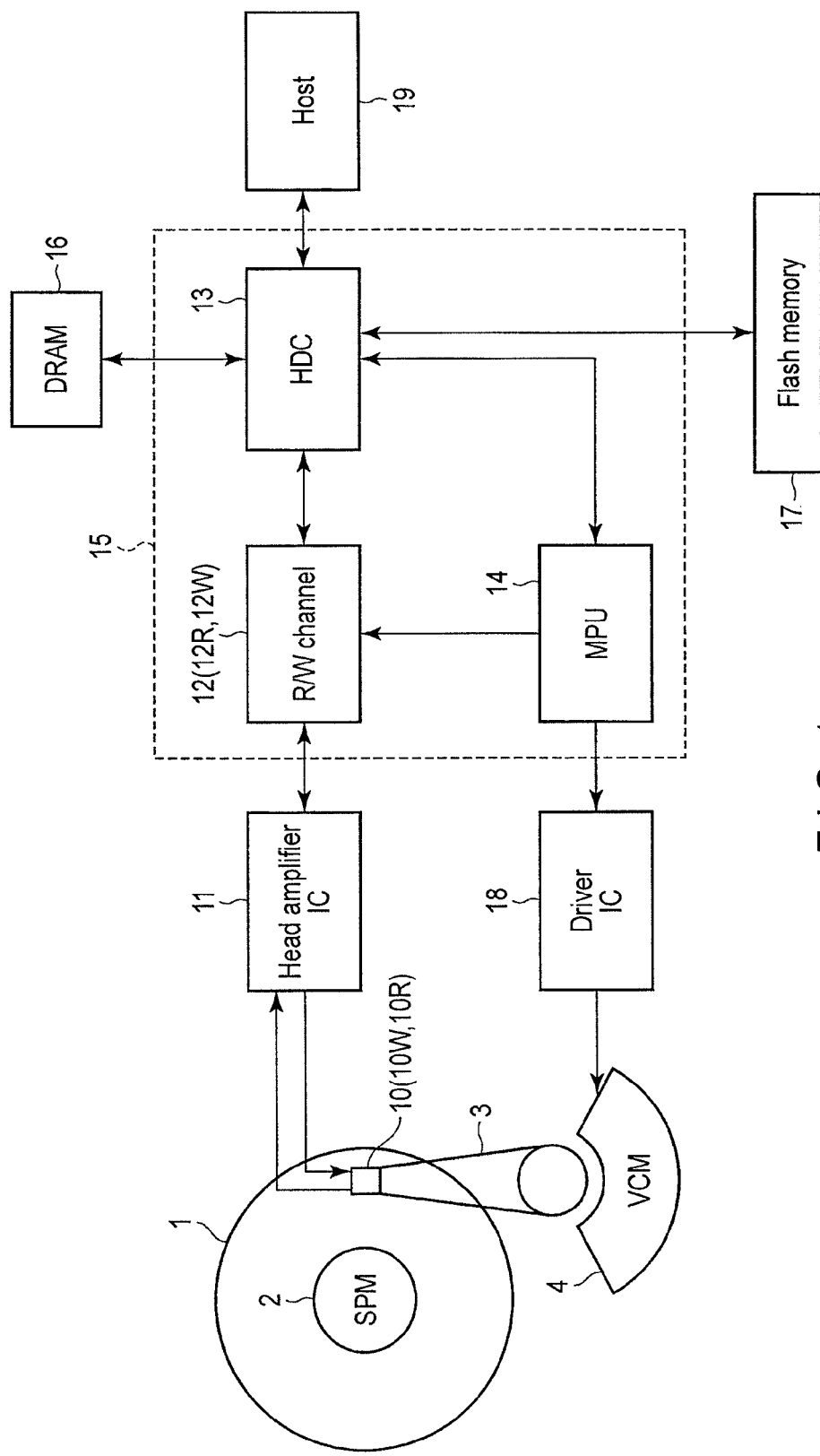
F I G. 1

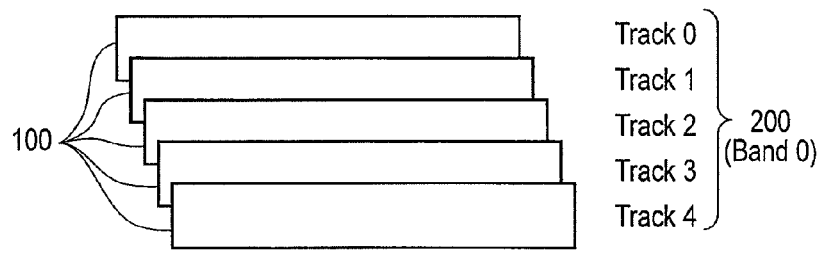
F I G. 2A
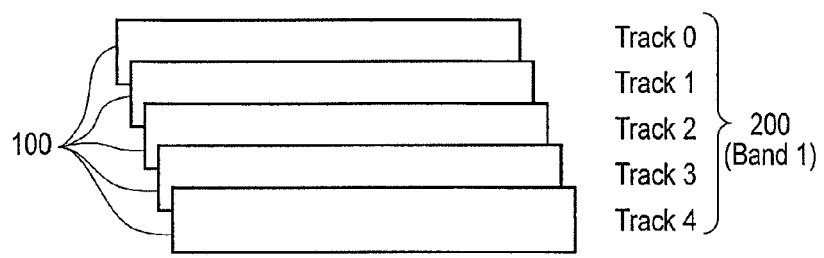
F I G. 2B
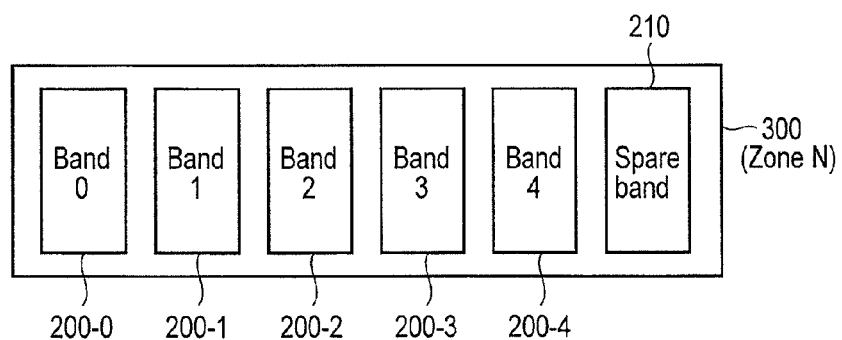
F I G. 3

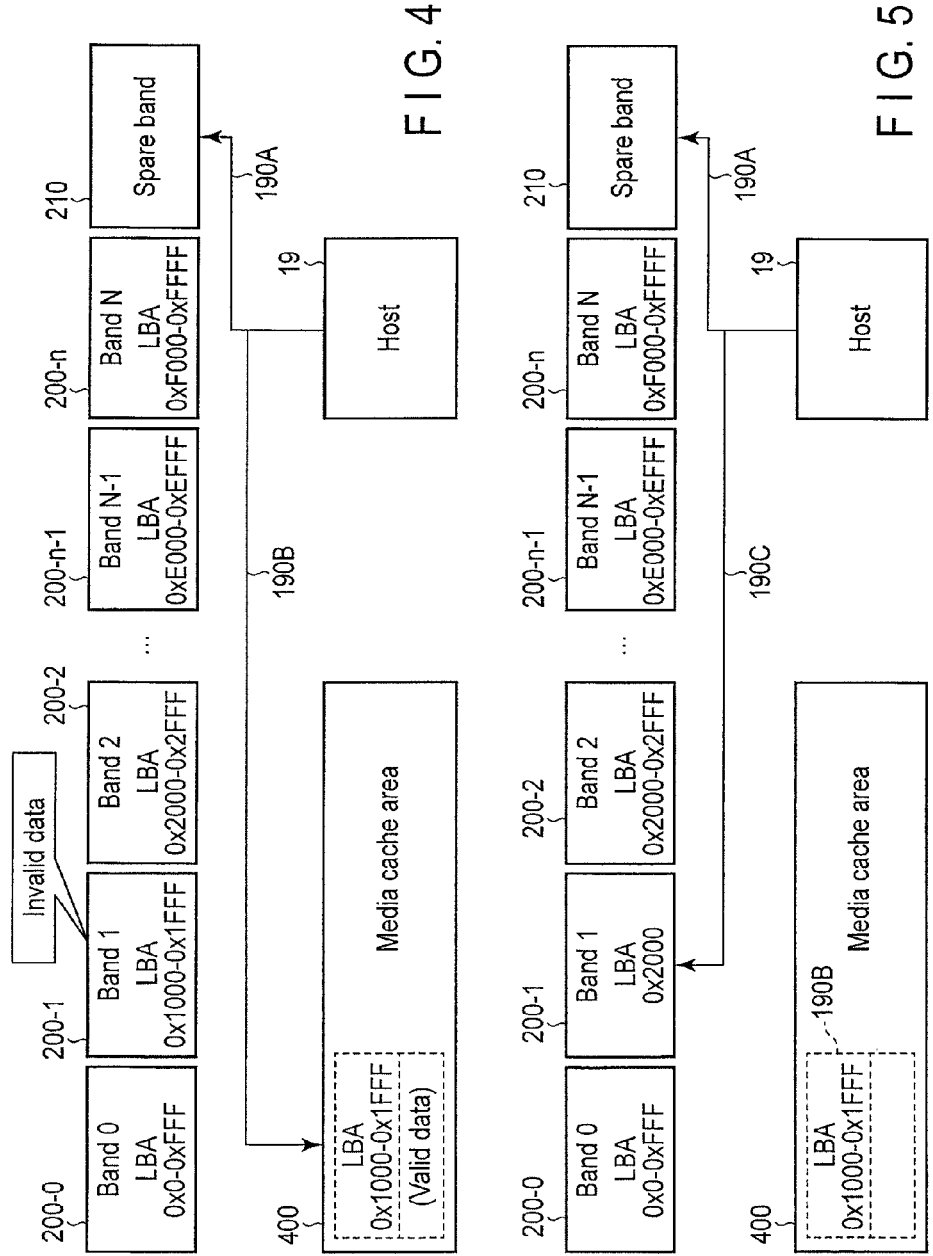

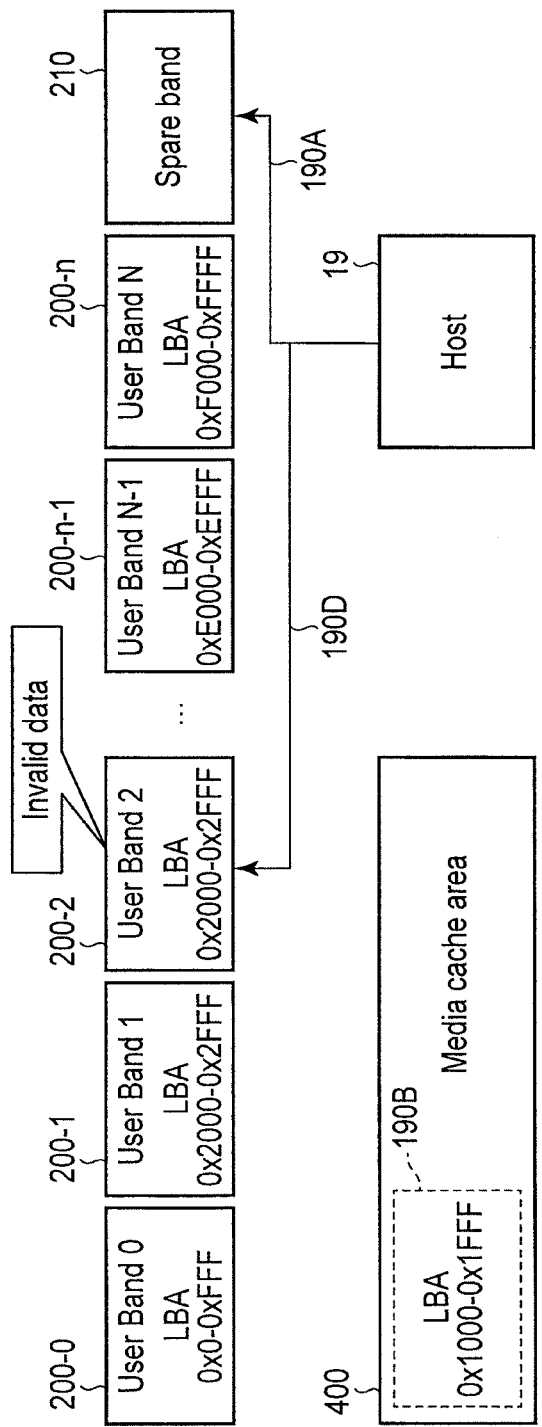
F I G. 6

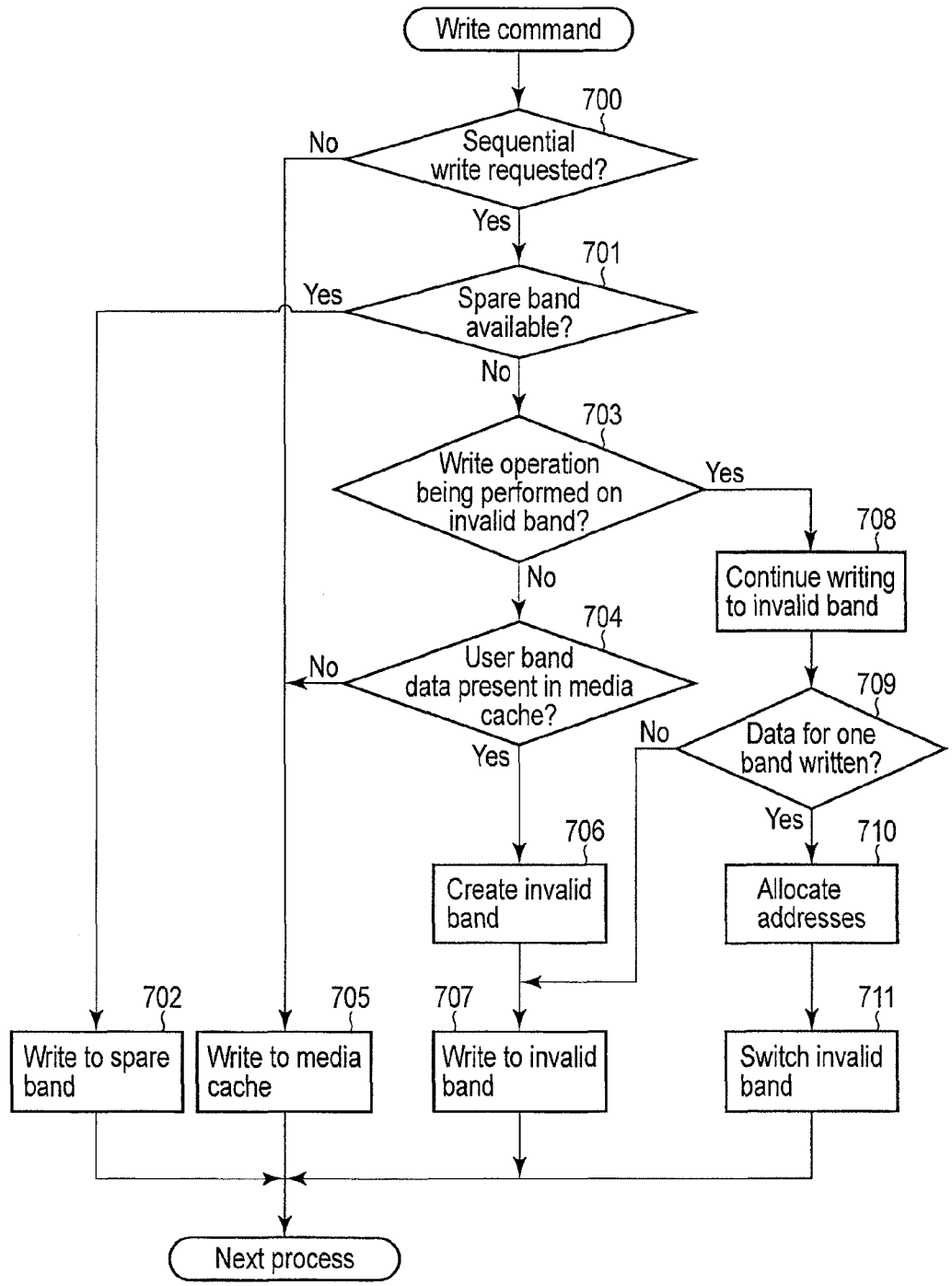
F I G. 7

DISK STORAGE APPARATUS AND METHOD FOR SHINGLED MAGNETIC RECORDING

CROSS-REFERENCE TO RELATED APPLICATIONS

This application is based upon and claims the benefit of priority from Japanese Patent Application No. 2012-283294, filed Dec. 26, 2012, the entire contents of which are incorporated herein by reference.

FIELD

Embodiments described herein relate generally to a disk storage apparatus and a method for shingled magnetic recording.

BACKGROUND

In the field of hard disk drives (hereinafter sometimes simply referred to as disk drives), a method for writing data called shingled write magnetic recording (SMR) has recently been developed to increase the recording density of disks that are recording media.

According to the SMR method, data is overwritten at a write head width larger than a read track width on a disk, and thus one side of recorded tracks is erased. This precludes a rewrite operation in units of tracks, and thus, data needs to be rewritten in units of recording areas (bands described below) each comprising a plurality of tracks. Consequently, the SMR method requires a relatively long processing time compared to a conventional rewrite process.

As a method for improving the efficiency of such a rewrite process, the use of both a media cache and a spare band has been proposed. The media cache is a specified recording area on the disk or a temporary data saving area (or a buffer area) that is formed of a nonvolatile memory such as a flash memory.

Furthermore, the spare band is a user data area which is distinguished from a band (hereinafter sometimes referred to as a user band) that is a normal user data area on the disk but which has the same capacity as that of the user band. The spare band can be changed to a user band by being assigned logical addresses (LBAs). That is, when user data is recorded in a spare band and LBAs are assigned to the spare band, the spare band is changed to a user band. In contrast, those of the other user bands which are not assigned any LBAs are managed as spare bands.

In particular, if a write command allowing a host to consecutively write data to a disk is processed, a rewrite process can be carried out more efficiently by writing those of the consecutive data which have certain LBAs to a spare band and writing data with the other LBAs to a media cache. The consecutive data is write data with sequentially consecutive logical addresses (LBAs).

However, the data continues to be written to the media cache until a new spare band is secured. This inevitably increases a load on the media cache. Thus, a possible decrease in the amount of free space in the media cache may cause a delay in a response to a subsequent write command, reducing the efficiency of the rewrite process.

BRIEF DESCRIPTION OF THE DRAWINGS

FIG. 1 is a block diagram for explaining a configuration of a disk drive according to an embodiment;

FIGS. 2A and 2B are diagrams for explaining a shingled write operation according to the embodiment;

FIG. 3 is a diagram for explaining a configuration of a user band and a spare band according to the embodiment;

FIG. 4 is a diagram for explaining a first sequential write operation according to the embodiment;

FIG. 5 is a diagram for explaining a second sequential write operation according to the embodiment;

FIG. 6 is a diagram for explaining a third sequential write operation according to the embodiment; and FIG. 7 is a flowchart for explaining a sequential write operation according to the embodiment.

DETAILED DESCRIPTION

In general, according to one embodiment, a disk storage apparatus includes a storage device, a writing controller, and a controller. The storage device includes a nonvolatile cache area in which a part of consecutive data is temporarily stored. The writing controller is configured to write the consecutive data in a recording area on a disk by an SMR method, the recording area being different from the cache area. The controller is configured to write the part of the data to the cache area, to invalidate data corresponding to logical addresses of the part of the data and recorded in the recording area on the disk, and to set a recording area with the invalidated data recorded therein to be an update recording area in which new data is recordable.

Various embodiments will be described hereinafter with reference to the accompanying drawings.

[Disk Drive Configuration]

FIG. 1 is a block diagram showing an important part of a disk drive according to the present embodiment.

As shown in FIG. 1, the disk drive generally comprises a head-disk assembly (HDA), a head amplifier integrated circuit (hereinafter referred to as a head amplifier IC) 11, and a system controller 15 comprising a single-chip integrated circuit.

The HDA comprises a disk 1 that is a recording medium, a spindle motor (SPM) 2, an arm 3 with a head mounted thereon, and a voice coil motor (VCM) 4. The disk 1 is rotated by the spindle motor 2. The arm 3 and the VCM 4 form an actuator. The actuator is driven by the VCM 4 to controllably move the head 10 mounted on the arm 3 to a specified position on the disk 1.

The head 10 includes a slider as a main body and comprises a write head 10W and a read head 10R mounted on the slider. The read head 10R reads data recorded in data tracks on the disk 1. The write head 10R writes data to the disk 1.

The head amplifier IC 11 comprises a read amplifier and a write driver. The read amplifier amplifies a read signal read by the read head 10R and transmits the amplified read signal to a read/write (R/W) channel 12. In contrast, the write driver transmits a write current corresponding to write data output by the R/W channel 12, to the write head 10W.

The system controller 15 includes the R/W channel 12, a hard disk controller (HDC) 13, and a microprocessor (MPU) 14. The R/W channel 12 includes a read channel 12R that carries out signal processing on read data, and a write channel 12W that carries out signal processing on write data. The system controller 15 implements a data writing controller that writes data to the disk 1 by the SMR method, together with the write head 10W.

The HDC 13 controls data transfers between the host 19 and the R/W channel 12. The HDC 13 performs data transfer control by controlling a buffer memory (DRAM) 16 to temporarily store read data and write data in the buffer memory 16.

The MPU 14 is a main controller and performs servo control by controlling the VCM 4 via a driver IC 18 to position the head 10. Moreover, the MPU 14 controls the head 10 so that the head 10 performs a shingled write magnetic recording (SMR) operation as described below.

Here, according to the present embodiment, the disk 1 includes a cache area (temporary recording area) called a media cache and secured, for example, on an outer circumferential side. The cache area may be secured on an inner circumferential side or in a middle circumferential area or in a flash memory 17.

[SMR Method]

FIGS. 2A and 2B are diagrams for explaining an SMR operation adopted for the disk drive according to the present embodiment.

In the disk drive, the write head 10W writes data to the disk 1 to form tracks (data tracks) on the disk 1 in a radial direction thereof. As shown in FIGS. 2A and 2B, according to the SMR method, tracks 100 are sequentially overwritten. A data recording area (or a data capacity unit) including a plurality of such tracks (for example, five tracks) is referred to as a band (Band0, Band1) 200. Here, a band distinguished from a spare band 210 described below and assigned logical addresses (LBAs) and in which normal user data is recorded is referred to as a user band 200.

A guard track is disposed between the bands 200 (Band0 and Band1) in order to avoid data interference. Here, data in each band 200 is written in the following order of track numbers: Track0, Track1, Track2, Track3, and Track4. Tracks 100 with track numbers Track0 to Track3 are each subjected, on one side, to interference from the next track to be written, and thus have a reduced data signal width. In contrast, a track 100 with track number Track4 is subjected to little interference from other tracks because no data is written to the guard track.

The SMR method, which involves such sequential overwriting, allows reduced track intervals to be designed, enabling an increase in the recording density of data tracks formed on the disk 1.

Here, on the disk 1, groups of tracks formed in the radial direction are divided into a plurality of zones (Zone) 300 for management. As shown in FIG. 3, according to the present embodiment, the spare band 210 is provided for each zone 300 (Zone N [N is a number]). The spare band 210 is a spare recording area which is distinguished from user bands 200-0 to 200-4 (Band0 to Band4) and in which, during a sequential write operation, data is directly written without using a media cache, as described below.

[Sequential Write Operation]

Now, a rewrite process based on a sequential write operation according to the present embodiment will be described with reference to FIGS. 4 to 6 and a flowchart in FIG. 7.

First, the MPU 14 determines whether or not a requested write operation is sequential write based on a write command (including logical addresses LBAs) from the host 19 (block 700). The sequential write is an operation of writing (rewriting) data with consecutive LBAs. The present embodiment is applied particularly to sequential writing of a plurality of files.

If the write command from the host 19 is indicative of normal write instead of the sequential write, the MPU 14 writes data requested to be written, to a media cache (media cache 400 described below) on the disk 1 via the buffer memory 16 (NO in block 700 and block 705). The media cache is an area in which data requested by the host 19 to be written is temporarily stored if a write operation is performed by the SMR method. The media cache is a recording area secured, for example, on the outermost circumferential side of the disk 1, and has a sufficiently larger capacity than one band. The MPU 14 moves data temporarily stored in the media cache to a band that is a user data area at a predetermined timing for rewriting.

In contrast, if the write command from the host 19 is indicative of the sequential write (YES in block 700) and the spare band 210 is available (YES in block 701), the MPU 14 writes data 190A in a first file to a spare band in a zone corresponding to rewrite target LBAs (block 702). That is, as shown in FIG. 4, if the spare band 210 is available, the MPU 14 sequentially writes data 190A in the first file (starting with LBA 0xF000) to the spare band 210 (YES in block 701 and block 702).

Moreover, as shown in FIG. 4, if data 190B in a second file (for example, LBAs 0x1000 to 0x1FFF) is consecutively written in accordance with a new write command from the host 19, since the spare band 210 has already been used, the MPU 14 writes data 190B to an area other than the spare band 210 (NO in block 701). For convenience, in a first sequential write operation, the MPU 14 sequentially writes data 190B to the media cache 400 if conditions described below are met (NO in block 703, NO in block 704, and block 705).

Here, as shown in FIG. 4, if data 190B is sequentially written to the media cache 400, user data (i.e., write target data) in user band 200-1 (Band1) corresponding to the LBAs (0x1000 to 0x1FFF) of data 190B is invalidated. In this case, the MPU 14 moves data 190B with the LBAs (0x1000 to 0x1FFF) temporarily stored in the media cache 400, to a user band at a predetermined timing for rewriting. User band 200-1 (Band1) in which invalidated data is stored is referred to as an invalid band for convenience. That is, the invalid band is an update recording area which can be a new spare band and in which new data can be recorded.

Now, for convenience, a rewrite operation based on a second sequential write operation will be described with reference to FIG. 5.

That is, as shown in FIG. 5, if subsequent data (starting with, for example, LBA 0x2000) 190C in the second file is consecutively written, the MPU 14 the data is sequentially written to a recording area other than the spare band 210, in this case, to the invalid band 200-1 (Band1) instead of the media cache 400 (NO in block 701, NO in block 703, and block 707).

Here, as shown in FIG. 4, all user data with the LBAs (LBAs 0x1000 to 0x1FFF) assigned to user band 200-1 (Band1) is present in the media cache 400, and thus, the MPU 14 sets user band 200-1 (Band1) to be an invalid band (YES in block 704 and block 706). Specifically, the MPU 14 sets a flag in table information for management of user bands 200-0 to 200-n to set user band 200-1 (Band1) to be an invalid band.

As shown in FIG. 5, the MPU 14 starts writing data 190C to user band 200-1 (Band1) set to be an invalid band (block 707), and continues to write the data until all of the data for one band (LBAs 0x2000 to 0x2FFF) is written (YES in block 703, block 708, and NO in block 709). When all of data 190C is written to the set invalid band, addresses (LBAs) are allocated to user band 200-1 (Band1) (YES in block 709 and block 710).

Subsequently, the MPU 14 carries out a switching process of clearing the invalid-band setting for user band 200-1 (Band1) (block 711). Here, as shown in FIG. 6, if data is sequentially written to user band 200-1 (Band1), the user data (rewrite target data) corresponding to the LBAs (0x2000 to 0x2FFF) of data 190C is invalidated. That is, the user data recorded in 200-2 (Band2) is invalidated. Thus, the MPU 14 sets user band 200-2 (Band2) to be an invalid band (YES in block 704 and block 706).

Now, for convenience, a rewrite operation based on a third sequential write operation will be described with reference to FIG. 6.

That is, as shown in FIG. 6, if subsequent data 190D in the second file is consecutively written, data 190D is sequentially written to a recording area other than the spare band 210, in this case, to the invalid band 200-2 (Band2) instead of the media cache 400 (NO in block 701, NO in block 703, and block 707).

Then, as described above, the MPU 14 starts writing data 190D to user band 200-2 (Band2) set to be an invalid band (block 707). The writing of the data is continued until all of the data for one band is written to user band 200-2 (YES in block 703, block 708, and NO in block 709). When all of data 190D is written to the set invalid band, the MPU 14 allocates addresses to user band 200-2 (Band2) (YES in block 709 and block 710).

As described above, according to the present embodiment, particularly if a plurality of files are consecutively sequentially written by the SMR method, the corresponding data is written to user bands 200-0 to 200-n set to be invalid bands rather than to the media cache 400. This saves the use of the media cache 400. Thus, even with a decrease in the amount of free space in the media cache 400, the present embodiment can avoid a situation in which a response to the subsequent write command is delayed to reduce the efficiency of the rewrite process. In other words, processing efficiency can be improved if consecutive data is rewritten.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
storage devices having a nonvolatile cache area in which a part of consecutive data is temporarily stored and a recording area including recording units each comprising a predetermined number of tracks on a disk, the recording unit including user data writing areas to which logical block addresses are assigned and a spare writing area to which no logical block address is assigned;
a writing part configured to write data in the recording area; and
a controller configured to control the writing of the consecutive data in accordance with a write command including a write request and the logical block address, wherein the controller is configured to:
write the consecutive data in the spare writing area by shingled magnetic recording (SMR), instead of the user data writing area which is specified by the logical block address and change the spare writing area to a new user data writing area to which the logical block addresses are assigned, if the write request is the sequential write request and the spare writing area is available,
write the consecutive data in the cache area, instead of the user data writing area which is specified by the logical block address, if the write request is the sequential write request and the spare writing area is not available, and
invalidate data in the user data writing area which is specified by the logical block address, after writing the consecutive data in one of the spare writing area and the cache area.

2. The disk storage apparatus of claim 1, wherein the storage devices further include a nonvolatile storage memory, the nonvolatile cache area is defined as a specified recording area on the disk or a recording area in the nonvolatile memory.

3. The disk storage apparatus according to claim 1, wherein the controller is further configured to:
change the specified user data writing area having invalidated data to an invalid user data writing areas which is available as the spare writing area, in which new consecutive data is recordable and to which no logical block address is assigned.

4. The disk storage apparatus of claim 3, wherein the controller is further configured to:
write the new consecutive data subsequent to the written consecutive data in the invalid user data writing areas, instead of the user data writing area which is specified by the logical block addresses, if the write request is the sequential write request and the invalid user data writing area is available, and
invalidate data in the user data writing area which is specified by the logical block address after writing the new consecutive data in the spare writing area.

5. The disk storage apparatus according to claim 4, wherein the controller is further configured to:
change the specified user data writing area having invalidated data to an invalid user data writing area which is available as the spare writing area, in which new consecutive data is recordable and to which no logical block address is assigned.

6. A method of data writing which is applied to a disk storage apparatus comprising storage devices having a nonvolatile cache area in which a part of consecutive data is temporarily stored and a recording area including recording units each comprising a predetermined number of tracks on the disk, the recording unit including user data writing areas to which logical block addresses are assigned and a spare writing area to which no logical block address is assigned, and a writing part configured to write data in the recording area, the method comprising:
controlling the writing of the consecutive data in accordance with a write command including a write request and the logical block address, wherein the controlling the writing includes:
writing the consecutive data in the spare writing area by shingled magnetic recording (SMR), instead of the user data writing area which is specified by the logical block address and changing the spare writing area to a new user data writing area to which the logical block addresses are assigned, if the write request is the sequential write request and the spare writing area is available;
writing the consecutive data in the cache area, instead of the user data writing area which is specified by the logical block address, if the write request is the sequential write request and the spare writing area is not available; and invalidating data in the user data writing area which is specified by the logical block address after writing the consecutive data in one of the spare writing area and the cache area.

7. The method according to claim 6, wherein the controlling further comprising:
changing the specified user data writing area having invalidated data to an invalid user data writing areas which is available as the spare writing area, in which new consecutive data is recordable and to which no logical block address is assigned.

8. The method of claim 7, wherein the controlling further includes:
writing the new consecutive data subsequent to the written consecutive data in the invalidated user data writing areas, instead of the user data writing area which is specified by the logical block address, if the write request is the sequential write request and the invalid user data writing area is available,
invalidating data in the user data writing area which is specified by the logical block address after writing the new consecutive data in the spare writing area.

9. The method according to claim 8, wherein the controller further controls the writing of the consecutive data to:
change the specified user data writing area having invalidated data to an invalid user data writing area which is available as the spare writing area, in which new consecutive data is recordable and to which no logical block address is assigned.

10. A disk storage apparatus comprising:
storage devices having a nonvolatile cache area in which a part of consecutive data is temporarily stored and a recording area including recording units each comprising a predetermined number of tracks on the disk, the recording unit including user data writing areas to which logical block addresses are assigned and one or both of a spare writing area and an invalid user data writing areas to which no logical block address are assigned;
a writing part configured to write data in the recording area; and
a controller configured to control the writing of the consecutive data in accordance with a write command including a write request and the logical block address, wherein the controller controller is configured to:
write the consecutive data in one of the spare writing area and the invalid user data writing areas by shingled magnetic recording (SMR), instead of the user data writing area which is specified by the logical block address and change the one of the spare writing area and the invalid user data writing areas to a new user data writing area to which the logical block addresses are assigned, if the write request is the sequential write request and the one of the spare writing area and the invalid user data writing areas is available,
write the consecutive data in the cache area, instead of the user data writing area which is specified by the logical block address, if the write request is the sequential write request and the both of the spare writing area and the invalid user data writing areas is not available, and
invalidate data in the user data writing area which is specified by the logical block address after writing the consecutive data in the one of the spare writing area and the invalid user data writing areas or the cache area.

11. The disk storage apparatus according to claim 10, wherein the controller is further configured to:
change the specified user data writing area having invalidated data to an invalidated user data writing area which is available as the spare writing area, in which new consecutive data is recordable and no logical block address is assigned.

12. The disk storage apparatus of claim 11, wherein the controller is further configured to:
write the new consecutive data subsequent to the written consecutive data in the invalid user data writing area instead of the user data writing area which is specified by the logical block address, if the write request is the sequential write request and the invalidated user data writing area is available,
write the new consecutive data in the cache area, instead of the user data writing area which is specified by the logical block address, if the write request is the sequential write request and the invalidated user data writing area is not available, and
invalidate data in the user data writing area which is specified by the logical block address after writing the consecutive data in one of the spare writing area and the cache area.

* * * * *